UNITED STATES PATENT OFFICE.

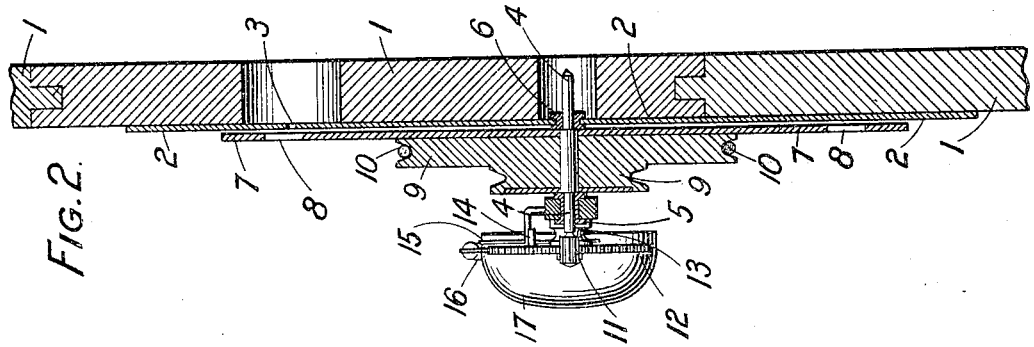
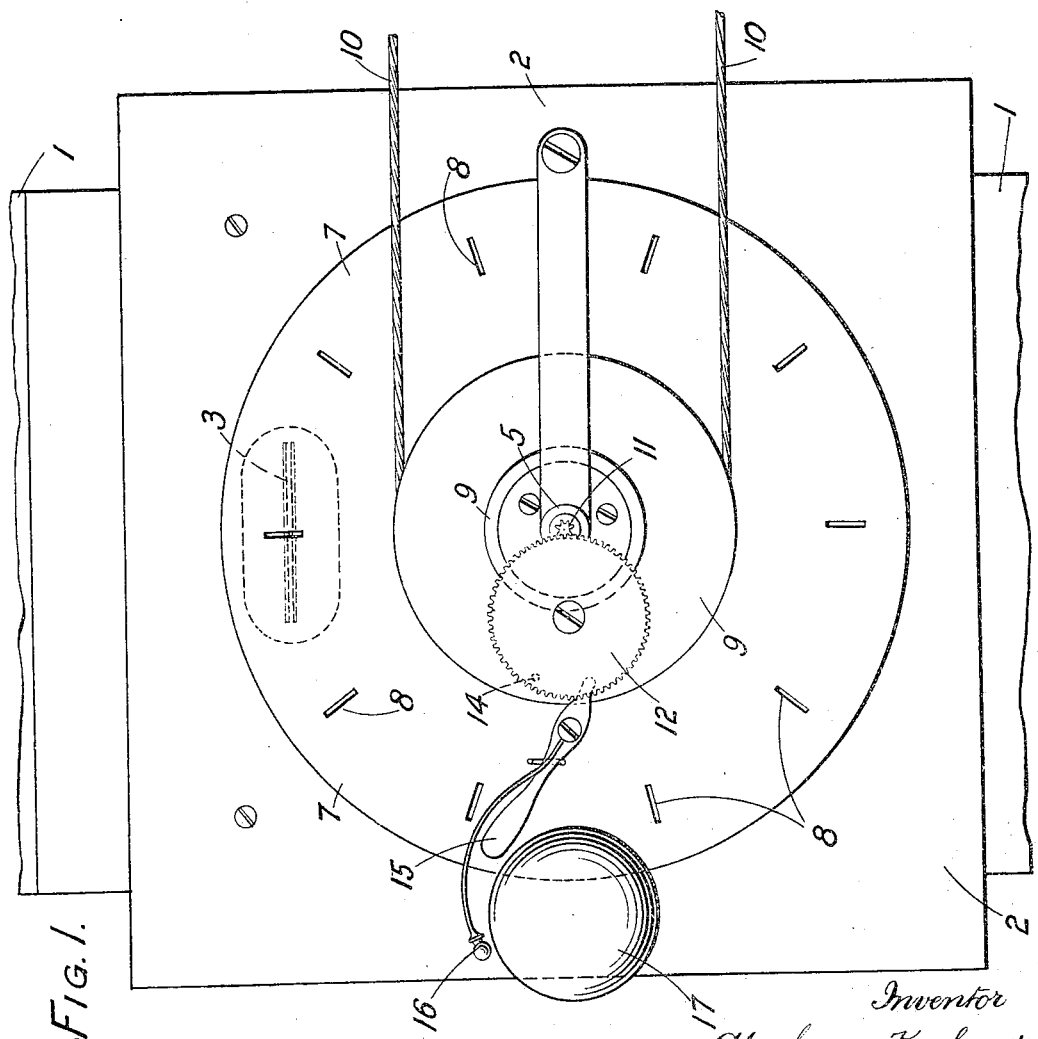

ABRAHAM KERSHAW, OF LEEDS, ENGLAND, ASSIGNOR OF ONE-HALF TO GRIFFITH BREWER, OF LONDON, ENGLAND.

APPARATUS TO BE USED IN MEASURING THE SPEED OF PHOTOGRAPHIC SHUTTERS.

No. 808,384. Specification of Letters Patent. Patented Dec. 26, 1905.

Application filed June 21, 1905. Serial No. 266,197.

*To all whom it may concern:*

Be it known that I, ABRAHAM KERSHAW, a subject of the King of Great Britain, residing at Dorrington street, Leeds, in the county of York, England, have invented a certain new and useful Apparatus to be used in Measuring the Speed of Photographic Shutters, of which the following is a specification.

This invention refers to an apparatus to be used in measuring the speed of photographic shutters and the like, and comprises a stationary plate formed with slit, which may be horizontal and is located in front of a source of light, so that the light-rays pass through the said slit. Adjacent to the stationary plate and in a parallel plane therewith is a revolving disk having a number of radial slits formed at equal distances apart at intervals corresponding to the length of the slit in the stationary plate, and the axis of the disk is so placed that when the latter revolves the radial slits therein will pass over the slit of the stationary plate and admit rays of light therefrom through the said revolving disk as the slits of the latter pass over the slit of the former. As the disk is caused to rotate at sufficient speed the stationary slit appears to be permanently illuminated, owing to the persistence of vision, and when this illuminated slit (with the disk revolving in front of it) is viewed through the aperture of a photographic shutter in motion, which shutter has a shorter period than the period occupied by the passage of one of the disk-slits across the slit in the stationary plate, a dark portion will appear in the apparently illuminated aperture of the stationary plate, of a length corresponding to the difference of periods between the speed of the shutter and the speed with which the slits of the revolving disk pass the slit in the stationary plate, so that by gradually increasing the speed of the disk the dark portion can be eliminated. At the moment when this is effected the speed of the shutter which is to be ascertained is equal to the time occupied by an aperture in the disk passing over the aperture in the stationary plate; but in practice the time is taken when the dark portion becomes reduced to a dark diagonal line, and from this the speed of the shutter can easily be calculated, as will be well understood.

The invention will now be described with reference to the accompanying drawings, whereon—

Figure 1 is a front elevation, and Fig. 2 is a transverse section, of a speed-measuring apparatus constructed in accordance with my invention.

The apparatus consists of a backboard 1, carrying the stationary plate 2, having a horizontal slit 3, as aforesaid, formed therein, which slit 3 is located in front of a source of light, and the light-rays may be directed through the slit by a condenser. In close proximity to this stationary plate 2 and in a parallel plane therewith is a disk 7, mounted on a spindle 4, which is revolubly carried in bearings 5 6. The disk 7 is, in the construction shown, arranged in front of the plate 2, and this is a convenient construction, although, if desired, the said disk might be at the back of the said plate. The disk 7 has a series of radial slits 8 formed therein at equal distances apart, the number of slits 8 being such that the mean or intervening distance separating each two adjacent slits 8 is the same distance as or is equal to the length of the slit 3 in the stationary plate 2.

The spindle 4 is provided with pulleys 9, which are also fixed to the disk 7, whereby the latter is rotated through the medium of a cord 10, driven by a motor, (not shown in the drawings,) and for convenience the disk 7 may have ten slits 8 formed therein, as illustrated. The spindle 4 also carries a spur-pinion 11, which gears with a spur-wheel 12, revolubly mounted on a stud 13, and for convenience these wheels are geared at ten to one, while the wheel 12 is provided with a pin 14, which engages a pivoted detent 15, carrying a hammer 16, in connection with a bell 17, which pin 14 actuates the detent 15 and causes the bell 17 to sound once for each revolution of the wheel 12 or once for every ten revolutions of the disk 7, and by such means the time occupied by the passage of a slit in the rotary disk across the stationary slit can be calculated. On revolving the disk 7 slowly a spot of light appears to be carried along the stationary slit 3, by reason of one of the slits 8 passing across the latter, and this action is continuous, for as one spot of light ends by the limit of the slit 3 another one makes its appearance, thereby making one period. If the speed of the disk 7 be increased to ten or more periods per second, there appears to be a continuously-illuminated slit 3, owing to the persistence of vision.

The apparatus constructed as described is employed as follows: The light-rays being free to pass or being directed through the slit 3 of the stationary plate and the disk 7 being set in motion, the photographic or any other shutter the time of which is to be tested is supported in front of the revolving disk 7 in such a position that the apparently illuminated stationary slit can be observed through the opening of the shutter. The shutter is then operated, and if the latter has a shorter period than the time occupied by the passage of one of the slits 8 of the revolving disk across the stationary slit 3 an apparent dark portion will be seen by observer intersecting the illuminated slit, and the width of this dark portion varies when viewed through a shutter of constant period according to the speed of the passage of a slit 8 across the slit 3. If a large dark portion is seen, then the speed of the disk should be increased. If the speed of the disk 7 is thus gradually increased until the aforesaid dark portion is nearly eliminated, then the period of the shutter and the passage of a slit 8 across the slit 3 are the same. The actual speed of the shutter can then be readily ascertained by taking the number of revolutions of the disk in a given time, and in order to facilitate this operation in the example of construction shown and described the bell 17 is rung once for each ten revolutions of the disk 7, and therefore the bell sounds once for each hundred times a slit 8 passes over the slit 3, and thus the timed speed of the shutter can be obtained, as will be readily understood. For estimating slower speeds than one-tenth of a second estimates can be made of the dark and light portions of the slit 3.

The slit 3 is usually viewed through a magnifying-lens; but this is not absolutely necessary.

What I claim as my invention, and desire to secure by Letters Patent, is—

1. An apparatus for measuring the speed of photographic shutters and the like consisting in the combination with a stationary plate having a slit formed therethrough through which light-rays can pass; of a disk located parallel with and adjacent to the plate, said disk having a number of radial slits at equal distances apart at intervals corresponding to the length of the slit of the stationary plate, a pivot upon which the disk revolves located so that the disk-slits pass in front of the slit of the stationary plate, means for revolving the disk at variable speeds, and means for ascertaining the number of revolutions of said disk whereby upon observing the apparently illuminated disk through a moving shutter and regulating the speed of the disk until any dark portion in the illuminated slit is nearly eliminated, the period of the shutter will accord with the time occupied by the passage of a disk-slit over the stationary slit.

2. In apparatus for measuring the speed of photographic shutters and the like, the combination with a vertical stationary plate having a horizontal slit formed therethrough through which light-rays can pass; of a disk located parallel with and adjacent to the plate, said disk having a number of radial slits at equal distances apart at intervals corresponding to the length of the slit of the stationary plate, said slits being located near the periphery of the disk, a pivot fixed at the center of the disk and bearings carried by the stationary plate to support the pivot, so that the disk-slits pass in front of the slit of the stationary plate, a pulley on the pivot for revolving the disk, and mechanism for signaling the number of revolutions of said disk.

3. In apparatus for measuring the speed of photographic shutters and the like, the combination with a vertically-stationary plate located in front of a source of light, said plate having a horizontal slit formed therethrough through which light-rays can pass; of a disk located parallel with and adjacent to the plate, said disk having a number of radial slits at equal distances apart at intervals corresponding to the length of the slit of the stationary plate, said slits being located near the periphery of the disk, a pivot fixed at the center of the disk and bearings carried by the stationary plate to support the pivot, so that the disk-slits pass in front of the slit of the stationary plate, a pulley on the pivot for revolving the disk, a spur-pinion fixed on the disk-pivot, a spur-wheel gearing with the pinion, means for carrying the axis of the spur-wheel, a pin on the said spur-wheel, a pivoted detent with which the pin on the spur-wheel engages once in each revolution, a hammer carried by the detent and a bell upon which the hammer acts once in each revolution of the spur-wheel to audibly indicate the completion of a predetermined number of revolutions.

ABRAHAM KERSHAW.

Witnesses:
JOHN JOWETT,
VANCE E. GALLOWAY.